(12) United States Patent
Jochman

(10) Patent No.: US 11,692,549 B2
(45) Date of Patent: Jul. 4, 2023

(54) METHODS AND SYSTEMS FOR AIR COMPRESSOR AND ENGINE DRIVEN CONTROL

(71) Applicant: Illinois Tool Works Inc., Glenview, IL (US)

(72) Inventor: Nathan Joe Jochman, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/158,521

(22) Filed: Jan. 26, 2021

(65) Prior Publication Data

US 2021/0148363 A1 May 20, 2021

Related U.S. Application Data

(63) Continuation of application No. 15/810,824, filed on Nov. 13, 2017, now Pat. No. 10,900,485.

(51) Int. Cl.
*F04C 28/06* (2006.01)
*F04B 49/22* (2006.01)
(Continued)

(52) U.S. Cl.
CPC .......... *F04C 28/06* (2013.01); *B23K 9/1006* (2013.01); *B23K 9/32* (2013.01); *F02B 63/04* (2013.01);
(Continued)

(58) Field of Classification Search
CPC ........ F04C 28/06; F04C 28/24; F04C 29/005; F04C 29/06; F04C 2210/1005; F04C 2210/221; F04C 18/16; F04C 2270/185; F04C 2270/44; F04C 2270/605; F04C 28/10; F02D 29/04; B23K 9/32; B23K 9/1006; F04B 49/22; F04B 49/08; F04B 35/002; F04B 49/02; F04B 42/22;
(Continued)

(56) References Cited

U.S. PATENT DOCUMENTS 3,602,610 A * 8/1971 Bloom .................. F04C 28/06
417/12
3,941,012 A * 3/1976 Mayer ................. B60H 1/3222
74/661

(Continued)

OTHER PUBLICATIONS

Operating, Maintenance, Repair and Troubleshooting Instructions for the HMBC 500/220 Fire Pump with the Autocafs Commander Control System (hereafter Darley), published 2012.

*Primary Examiner* — Thomas Fink
(74) *Attorney, Agent, or Firm* — McAndrews, Held & Malloy, Ltd.

(57) ABSTRACT

Power systems and methods of controlling an engine driven air compressor include an air compressor driven by an engine via a clutch. A first pressure sensor configured to sense a pressure level at an outlet of the air compressor. An inlet valve configured to close in response to the first pressure sensor sensing a pressure level above a first pressure level. In addition, a second pressure sensor to sense a pressure level below a second pressure level at a housing of the air compressor, wherein the clutch is configured to disengage in response to the second pressure level, wherein the first pressure level is higher than the second pressure level.

18 Claims, 6 Drawing Sheets

(51) Int. Cl.

| | | |
|---|---|---|
| *F02D 29/04* | (2006.01) | |
| *B23K 9/32* | (2006.01) | |
| *F04B 49/08* | (2006.01) | |
| *F04B 35/00* | (2006.01) | |
| *B23K 9/10* | (2006.01) | |
| *F02B 63/04* | (2006.01) | |
| *F02B 63/06* | (2006.01) | |
| *F04C 28/24* | (2006.01) | |
| *F04C 29/00* | (2006.01) | |
| *F02D 29/06* | (2006.01) | |
| *F04C 18/16* | (2006.01) | |

(52) U.S. Cl.
CPC .............. *F02B 63/06* (2013.01); *F02D 29/04* (2013.01); *F04B 35/002* (2013.01); *F04B 49/08* (2013.01); *F04B 49/22* (2013.01); *F04C 28/24* (2013.01); *F02D 29/06* (2013.01); *F04C 18/16* (2013.01); *F04C 29/005* (2013.01); *F04C 2210/1005* (2013.01); *F04C 2210/221* (2013.01); *F04C 2270/185* (2013.01); *F04C 2270/44* (2013.01)

(58) Field of Classification Search
CPC .......... F04B 63/06; F04B 4/225; F02B 63/04; F02B 63/06; F01C 20/06
USPC ....................................... 417/12, 15, 34, 223
See application file for complete search history.

(56) References Cited

U.S. PATENT DOCUMENTS

| | | | | |
|---|---|---|---|---|
| 4,149,827 | A * | 4/1979 | Hofmann, Jr. .......... | F04B 41/00 417/12 |
| 5,114,315 | A * | 5/1992 | Kaltenthaler ......... | B60T 17/006 417/18 |
| 5,713,724 | A * | 2/1998 | Centers .................... | F04C 28/12 417/53 |
| 6,082,971 | A * | 7/2000 | Gunn ..................... | F04B 39/066 417/32 |
| 2002/0039942 | A1* | 4/2002 | Liu ......................... | F02B 63/04 474/133 |
| 2006/0027547 | A1* | 2/2006 | Silvestro ................ | B23K 9/323 219/133 |
| 2006/0193728 | A1* | 8/2006 | Lindsey .................. | F04B 49/03 417/1 |
| 2006/0231644 | A1* | 10/2006 | Breedlove .............. | A62C 31/12 239/398 |
| 2008/0286128 | A1* | 11/2008 | Chang ..................... | F04B 35/06 417/313 |
| 2009/0194067 | A1* | 8/2009 | Peotter ................ | F02D 41/0205 123/350 |
| 2010/0158702 | A1* | 6/2010 | Colavincenzo ......... | B60L 50/62 417/16 |
| 2010/0199950 | A1* | 8/2010 | Renner .................... | F04C 18/16 417/53 |
| 2011/0052415 | A1* | 3/2011 | Renner .................... | H02K 7/003 219/108 |
| 2011/0255994 | A1* | 10/2011 | Field ....................... | E21B 21/16 417/307 |
| 2011/0309055 | A1* | 12/2011 | Rozmarynowski .... | H02K 7/003 219/108 |
| 2012/0156079 | A1* | 6/2012 | Hirata ..................... | F04C 18/16 418/201.1 |
| 2013/0042694 | A1* | 2/2013 | Ned ....................... | G01L 9/0054 73/715 |
| 2013/0211655 | A1* | 8/2013 | Ogata .................... | E02F 9/2292 701/22 |
| 2013/0247573 | A1* | 9/2013 | Kennedy ................ | F02B 63/04 60/722 |
| 2014/0151120 | A1* | 6/2014 | Ledbetter .............. | E21B 21/16 175/57 |
| 2018/0172005 | A1* | 6/2018 | Berlage .................. | F04B 23/00 |
| 2020/0240415 | A1* | 7/2020 | Kotani .................... | F04B 49/20 |

* cited by examiner

METHODS AND SYSTEMS FOR AIR COMPRESSOR AND ENGINE DRIVEN CONTROL

CROSS-REFERENCE TO RELATED APPLICATIONS

This application is a continuation of U.S. application Ser. No. 15/810,824, entitled "METHODS AND SYSTEMS FOR AIR COMPRESSOR AND ENGINE DRIVEN CONTROL," filed Nov. 13, 2017, which is hereby incorporated by reference in its entirety for all purposes.

BACKGROUND

Conventionally, engine-driven power systems are configured to power multiple components, such as generators, air compressors, welders, to name but a few. Many different types of power systems exist with a variety of components and functions, such as home-standby generators, portable generators and/or welders, and portable air compressors.

Some engine driven air compressors are either driven at all times by a direct continuous, connection with the engine, or intermittently via a clutch or other variable and/or disconnecting member. However, such power systems can consume large amounts of fuel, require frequent maintenance, and cause environmental noise and exhaust during operation. Thus, an engine-driven power system to drive an air compressor that mitigates these negative effects is desirable.

SUMMARY

Engine driven power systems and methods for an improved air compressor control are disclosed, substantially as illustrated by and described in connection with at least one of the figures. In particular, a system to control an air compressor and/or an engine based on a sensed air pressure at the air compressor to reduce a load on the engine is provided herein.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
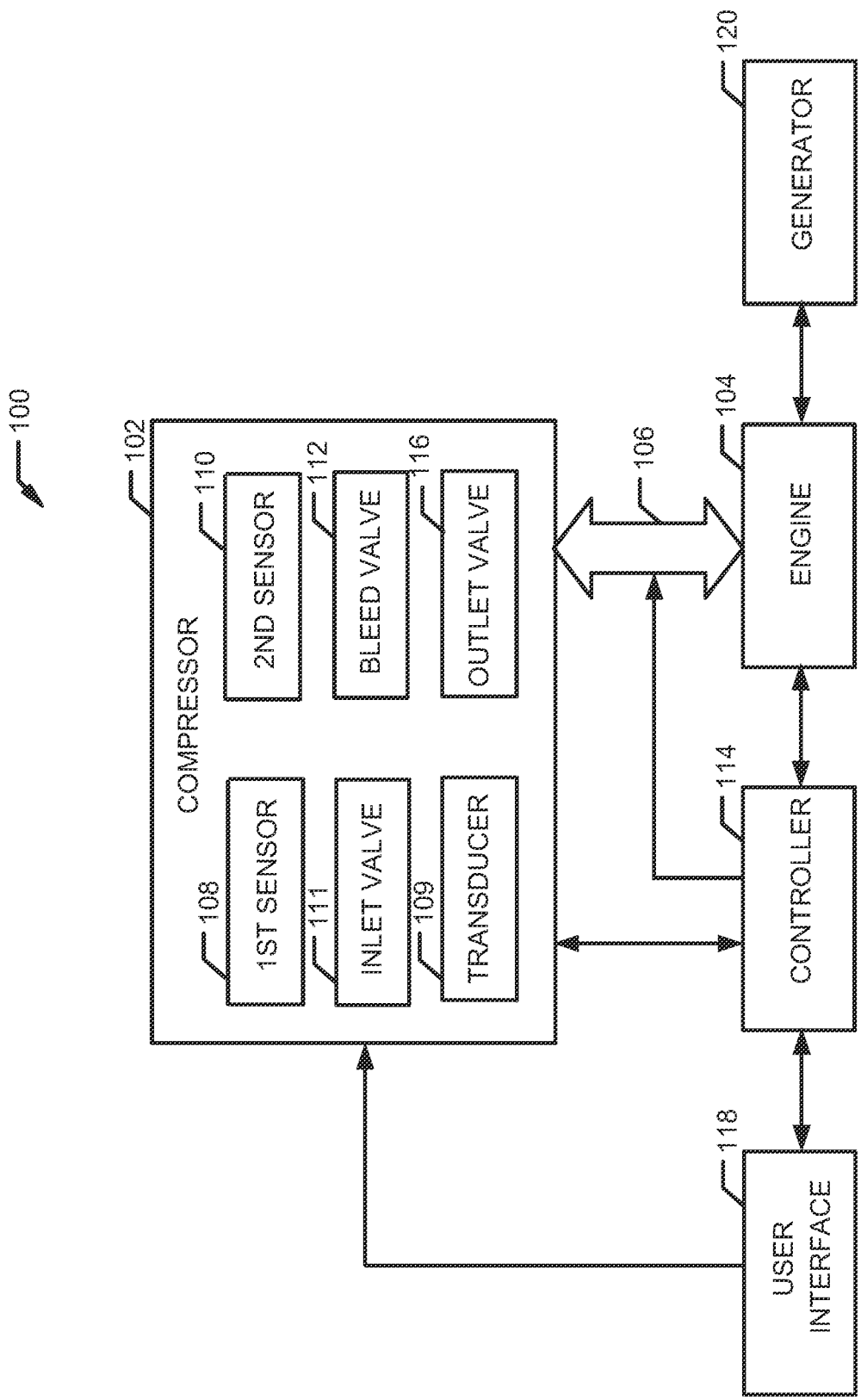
FIG. 1 is a functional diagram of an example power system, in accordance with aspects of this disclosure.

Conventionally, engine driven generators and air compressors systems are either driven at all times by a direct, continuous connection with the engine, or intermittently via a clutch or other variable and/or disconnecting member.

Air compressors that turn continuously may be configured to stop producing air when pressurized output is not needed. Cessation of output from such air compressors can be achieved in a variety of ways, such as by closing the air compressor inlet, or diverting the unused air to be exhausted to the atmosphere. Both procedures allow the compressor to spin while consuming less energy. With the decreased load, less energy is required such that conventional systems may idle the engine with the air compressor load still connected.

In the example of a fixed throttle air compressor driven by the engine, this idle speed varies depending on the engine temperature and compressor load, which are both variables dependent on ambient temperature, system temperature, operating conditions of the components, etc. However, if an electric generator is also coupled to the engine, for example, the variable idle speed can create problems as the resulting electrical power produced can vary, causing unpredictable weld starts and a less responsive engine. In addition, the fuel consumption remains high because of the continuing load from the compressor even as the engine is rotating at an idle speed. Such conventional systems typically do not operate with other airflow controls, since the air compressor is either on or off.

Compressors that are configured to be disconnected from the engine have the advantage of turning on and off as needed. This is of particular value for engines configured to power other devices, such as a generator. For example, if only output from the generator is needed, the compressor can be turned off. If an output is needed (e.g. pressurized air), the clutch can engage the compressor and activate airflow to provide pressurized air as needed.

For a reciprocating type compressor, the clutch cycles on and off to increase air pressure within an air tank, or housing, as need. This function can be controlled by a pressure switch in the air tank. For a rotary screw compressor, the clutch can be cycled by a pressure switch in the air tank, or if no tank is being used, a control scheme can determine the timing and operation of the throttle at the air inlet to meet output demand. For instance, the inlet throttle control can be a pneumatic proportional control valve that closes the inlet when outlet pressure meets a target pressure level. The proportional control can also be configured to partially open the inlet to control flow levels, as well as opening fully to allow maximum flow at the inlet. The inlet throttle control can also be an electric control which closes the inlet valve when a pressure switch or sensor identifies a predetermined level, and opens the valve with a different (e.g., lower) pressure. Partial flow can, however, be controlled by an electric controller.

Both the proportional and electric control systems used in rotary screw type air compressors keep the compressor at full pressure, yet providing no output flow, when no output air is needed. Operating in this mode, however, consumes a high amount of power (i.e., requires significant fuel consumption) as, even though the pump is not pumping air for an output, the pump is spinning against a high differential pressure. The differential pressure is the case pressure (e.g., built up pressure within the housing) of the compressor which is at the output set pressure (e.g., about 150 pounds per square inch (psi)), less the inlet to the pump which is at a near vacuum (e.g., about −14 psi).

Furthermore, idling the engine with the high, no-flow load of the rotary screw compressor does not work with a fixed engine throttle position for small, gas-powered engines. This is due to the fact that the engine throttle cannot open enough to maintain an idle speed.

To improve upon conventional designs, this disclosure relates to configurations and operation of a compressor (e.g., an air compressor) in an engine driven system to mitigate negative effects of the conventional system. For example, the presently disclosed systems improve upon the conventional systems by allowing the engine and generator to be coupled to the compressor by a clutch. This configuration results in a compact, cost effective, and reliable system, with the compressor to be driven by the engine.

The system can be housed in an enclosure, the engine being a source of mechanical power, with the compressor utilizing that power to provide output in the form of compressed air. The mechanical power of the engine is transferred to the air compressor via a clutch, belt, idler pulley, compressor pulley, etc., which is directly connected to the engine crankshaft. In some examples, the engine is directly coupled to an electric generator to generate electrical power.

In some examples, the air compressor is a rotary screw type compressor driven by the engine. A rotary screw compressor is a type of gas compressor that uses a rotary type positive displacement mechanism. They are used to replace piston compressors where large volumes of high-pressure air are needed, such as for construction or industrial applications. The gas compression process of a rotary screw is a continuous sweeping motion, so the pressure build up is generally smooth relative to a piston compressor. Additionally, rotary screw compressors are relatively compact and operate smoothly with limited vibration. Some rotary screw compressors are characterized as oil-injected, where lubricating oil aids in sealing and cooling functions.

In disclosed examples, a method of controlling an engine driven air compressor is provided, which includes measuring, at a first pressure sensor, a first pressure level that exceeds a threshold pressure level at an outlet of the air compressor, adjusting an inlet valve of the air compressor in response to the first pressure level in order to limit an amount of air from being introduced into the air compressor from pumping air, measuring, at a second pressure sensor, a second pressure level that is lower than the first pressure level, and controlling, via a controller, a clutch to disengage in response to the second pressure level, the clutch configured to transfer power from an engine to the air compressor.

In examples, the method includes activating a bleed down valve in response to the first pressure level, which in turn controls the inlet valve to adjust.

In examples, the method includes measuring a duration of time during which the clutch of the air compressor is disengaged, determining, at the controller, that the duration exceeds a threshold time, and controlling, via the controller, the engine to idle in response to the determination. In examples, the method includes controlling, by the controller, the engine to idle at a constant speed in response to the determination.

In examples, the method includes, in response to the first sensor measuring a pressure level below the threshold pressure level, controlling, via the controller, the inlet valve to open, and controlling, via the controller, the clutch to engage.

In examples, the method includes deactivating the bleed down valve in response to measuring the pressure level below the threshold pressure level, which in turn controls the inlet valve to open. In examples, the first pressure sensor is configured to be adjusted by a user to set the threshold pressure level.

In examples, the first pressure sensor is one of a pressure transducer or a pressure switch configured to generate a signal in response to the first pressure level, the controller further configured to receive, at the controller, the signal; and control, via the controller, the inlet valve in response to the signal.

In other disclosed examples, a power system includes an air compressor driven by an engine via a clutch, a first pressure sensor configured to sense a pressure level at an outlet of the air compressor, an inlet valve configured to close in response to the first pressure sensor sensing a pressure level above a first pressure level, and a second pressure sensor to sense a pressure level below a second pressure level at a housing of the air compressor, wherein the clutch is configured to disengage in response to the second pressure level, wherein the first pressure level is higher than the second pressure level.

In examples, the system includes a bleed down valve configured to reduce the pressure within the air compressor in response to the first pressure level, which reduces the differential pressure and reduces the power needed to drive the air compressor.

In examples, the system includes an electric generator driven by the engine via a generator clutch, the generator clutch to drive the electric generator independently of the air compressor.

In examples, the controller is further configured to measure a duration of time during which the clutch of the air compressor is disengaged, determine whether the duration exceeds a threshold time duration, and control the engine to idle in response to a determination that the time duration exceeds the threshold time duration.

In examples, the controller is further configured to determine whether the engine is driving an electric generator, and control the engine to idle in response to determinations that the time duration exceeds the threshold time duration and the engine is not driving the electric generator. In examples, the threshold time duration is between 30 seconds and 2 minutes.

In yet additional examples, a welding-type power system controls an engine driven air compressor, the system includes a pressure sensor configured to measure a pressure level that exceeds a first pressure level at an outlet of the air compressor, an inlet valve of the air compressor configured to close in response to the pressure level in order to stop air from being introduced into the air compressor, and a controller. The controller is configured to activate a timer, and disengage a clutch in response to expiration of the timer, the clutch configured to transfer power from the engine to the air compressor.

In examples, the system includes a bleed down valve configured to activate in response to the first pressure level, which in turn controls the inlet valve to close, wherein the bleed down valve lowers the pressure level in the air compressor from the first pressure level to a second pressure level.

In examples, in response to the first sensor sensing a pressure level below the first pressure level, the bleed down valve is further configured to close, the inlet valve is configured to open, and the clutch is configured to engage. In examples, the first pressure sensor is a transducer having an adjustable pressure range.

In examples, the controller is further configured to receive signals from the transducer corresponding to the first or second pressure levels, and control one or more of the bleed down valve, the inlet valve, the clutch, or the engine in response to the signals. In examples, the time to expiration is between 30 seconds and 2 minutes. In some examples, the engine is configured to idle at a constant speed. In some examples, the first pressure is about 150 psi.

In yet other examples, a welding-type power system includes a rotary screw air compressor driven by an engine via a clutch.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit" includes any analog and/or digital components, power and/or control elements, such as a microprocessor, digital signal processor (DSP), software, and the like, discrete and/or integrated components, or portions and/or combinations thereof.

As used herein, the terms "first" and "second" may be used to enumerate different components or elements of the same type, and do not necessarily imply any particular order. For example, while in some examples a first compartment is located prior to a second compartment in an airflow path, the terms "first compartment" and "second compartment" do not imply any specific order in which airflows through the compartments.

FIG. 1 is a functional diagram of an example power system 100. The system 100 is an engine-driven power system, which includes an engine 104 that drives an air compressor 102 (e.g., a rotary screw type air compressor). The air compressor 102 is driven by the engine 104 via a clutch 106. The clutch 106 is configured to engage and or disengage the air compressor 102 based on one or more sensed conditions, as described herein. For example, the air compressor 102 can include one or more sensors to sense and/or measure a pressure at one or more locations within the system. Sensors can also be used to indirectly measure variables such as airflow, changes in temperature, forces acting on housings, among others. The sensors can be any type of sensor configured to measure a pressure, including analog and digital sensors, force collector type sensors such as piezo-resistive strain gauge, piezoelectric, optical fiber based sensors, potentiometric thermal sensors, transducers, pressure indicators, piezometers, manometers, to name but a few.

In the example of FIG. 1, a first sensor 108 and a second sensor 110 measure pressure(s) within a housing/tank of the air compressor 102, at an outlet, an inlet, and/or another location of the air compressor 102. In some examples, a bleed down valve 112 is included to moderate a pressure within the air compressor 102 housing. The bleed down valve 112 controls a compressor inlet valve 111 and to slowly reduce pressure in the compressor case when the inlet valve 111 is closed. In examples, a controller 114 is configured to monitor and/or control one or more conditions of the system 100. For instance, the controller 114 receives information from each of the first and second sensors 108, 110, as well as other operating parameters (e.g., temperature, rotation speed of one or both of the compressor 102 and engine 104, etc.) of the system 100.

In some examples, an electrical generator 120 is connected to the engine 104 to provide one or more types of electrical power suitable for specific and/or general purpose uses, such as welding-type power, 110 VAC and/or 220 VAC power, battery charging power, and/or any other type of electrical power. Furthermore, the example system 100 may include other components not specifically discussed herein.

In some examples, the system 100 employs a controller 114 for controlling an output of the air compressor 102. For instance, the controller 114 can engage the clutch 106 to operate at variable speeds in response to the speed of the engine 104, operate one or more valves to release pressure from the air compressor 102, as well as controlling the engine 114 to idle, such as when the compressor 102 is not in use. Additionally or alternatively, a user interface 118 can be employed to allow a system operator to adjust one or more parameters associated with the system 100. For example, one or more predetermined pressure levels and/or ranges can be adjusted via the user interface 114 to accommodate a particular operation or need. The user interface 118 can be integrated with and/or located remotely from the air compressor 102 and/or the controller 114.

In another example, the system 100 employs one or more transducers 109 configured to measure a first pressure level at an outlet of the air compressor and a second pressure level at a housing of the air compressor. The transducer 109 can measure pressure levels at the outlet valve 116 and the housing of the compressor, and transmit the information to the controller 114. The transducer 109 is configured to transmit a signal indicating the pressure level to the controller 114 via one or more circuits. The controller 114 can be configured to control the bleed down valve 112 (e.g., a solenoid valve), and/or the inlet valve 111, to activate in response to the first pressure level being above a first, high-pressure level as indicated by the signal from the transducer 109. Further, the controller 114 can control the clutch 106 to disengage in response to the second pressure level being below a second, low-pressure level. In this example, the transducer 109 is able to sense the pressure at multiple locations, such as by alternating measurements, and the controller 114 is capable of analyzing the signals from the transducer 109 to determine the appropriate control. In this manner, the transducer 109 can be used in addition to or as a substitute for the first and second sensors 108, 110.

Figure 2:
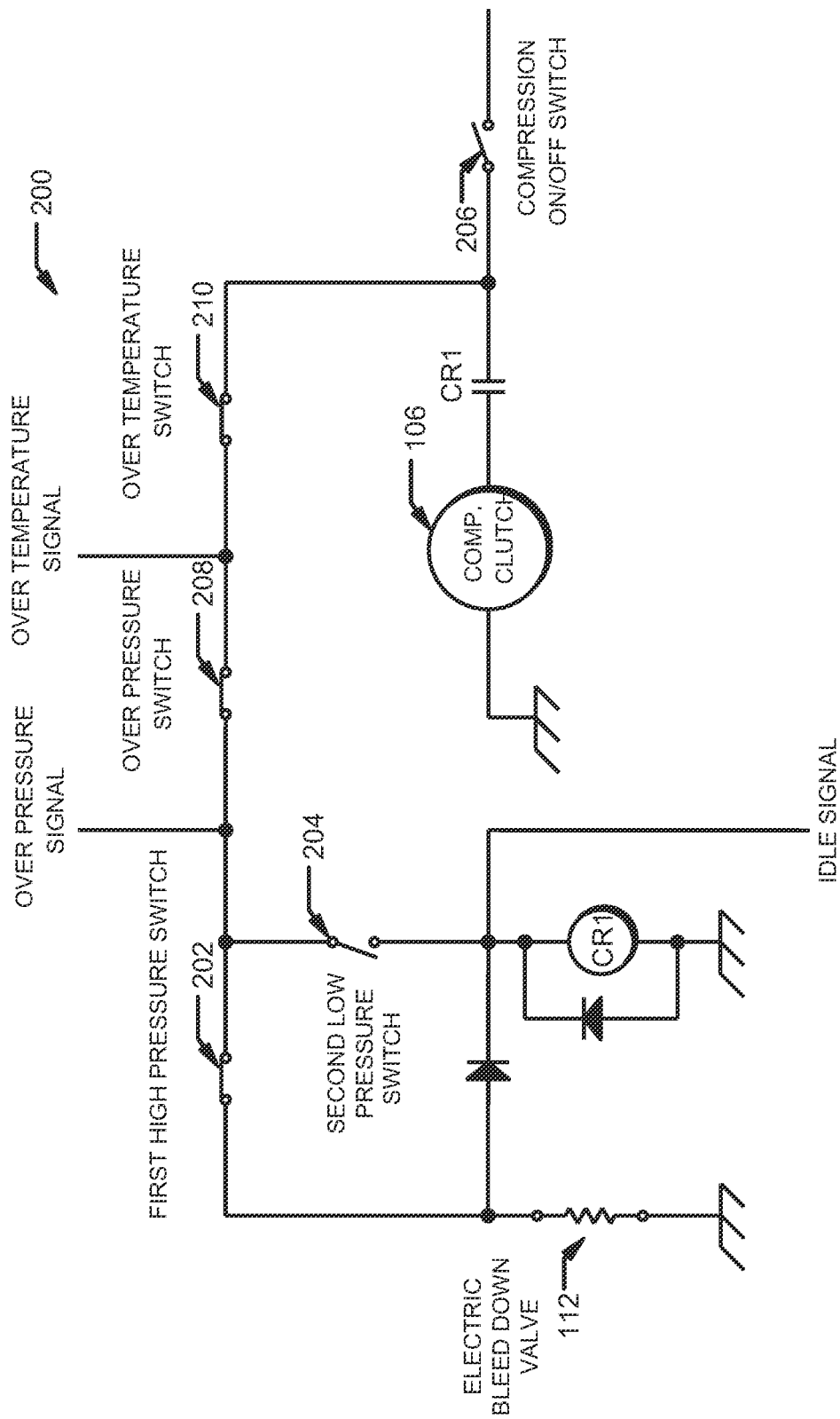
FIG. 2 illustrates an example control circuit to control a compressor of a power system, in accordance with aspects of this disclosure.

FIG. 2 illustrates an example control circuit 200 to operate an engine driven air compressor. In some examples, the control circuit 200 may implement and/or be integrated into the controller 114 of FIG. 1. In some examples, the control circuit 200 is a wholly separate controller configured to respond to changes in pressure and control the system components, as described with respect to FIG. 1. Where the circuit 200 incorporates components common to FIG. 1, similar numbering will be used to simplify descriptions of the figures.

The example circuit 200 responds to changes in the pressure level at the compressor 102, as described with respect to FIG. 1. In response to changes in the pressure level, a first, high-pressure switch 202 (e.g., the first sensor 108 of FIG. 1) and/or a second, low-pressure switch 204 (e.g., the second sensor 110 of FIG. 1) can change in state to control operation of the compressor 102, clutch 106, and/or the engine 104. Additionally or alternatively, an over pressure switch 208 and an over temperature switch 210 can be configured to activate in response to high-pressure and/or temperature levels at the compressor 102 and generate a signal to a controller (e.g., controller 114, a printed circuit board (PCB), etc.) to mitigate damage therefrom. Additionally or alternatively, a compression switch 206 is available to an operator to turn the compressor on and off to engage or disengage the circuit described with respect to FIG. 2.

In examples, when the pre-determined pressure is reached (e.g., 150 psi), the high-pressure switch 202 activates to open the electric bleed down valve 112. The bleed down valve 112 applies case pressure to close the inlet valve 111 and stop the compressor 102 from pumping air. At the same time, the bleed down valve 112 starts to relieve the compressor case or housing pressure through an outlet and/or valve. This bleed off slowly reduces pressure inside the compressor case which reduces the differential pressure and thus the no-flow power required to turn the compressor 102.

The outlet check valve 116 keeps air pressure downstream of the compressor 102 as the compressor case pressure is reduced through the bleed down process, which can take from 30 seconds to 2 minutes. The circuit 200 is configured to sense or receive information indicating that the air output has not been used, and proceeds to idle the engine 104 based on the information. The circuit 200 responds to the low-pressure in the compressor case, indicated via deactivation of a low-pressure switch 204 that is configured to close at a pressure level about 30 psi. The bleed down rate, for example from 150 psi to 30 psi, is determined by a bleed down outlet and may take between 30 seconds and 2 minutes to reach the desired pressure level. Once the low-pressure level is met in the compressor case, the clutch 106 to disengages in response.

In particular, as the compressor case bleeds down and pressure reduces to 30 psi, the low-pressure switch 204 deactivates which disengages the compressor clutch 106. The clutch 106 disengages and this electrical signal can be used to direct the engine 104 to enter into an idle mode. In examples where no load is on the engine 104, the engine 104 can idle with a fixed engine throttle position idle system at a consistent and predictable speed. With the clutch 106 disengaged, the compressor 102 enters into a stand-by mode. For instance, stand-by mode corresponds to the outlet pressure being maintained via the outlet check valve while the compressor 102 is at low or no pressure and disconnected from the engine 104. The compressor 102 is still on and restarts when air pressure at the outlet is reduced to the point the high-pressure switch 202 closes. Thus, the bleeding down of the compressor pressure is triggered by the high-pressure switch 202 along with the de-clutching and idling of the engine 104 triggered by deactivation of the low-pressure switch 204.

When air is used (e.g., to operate an air drive tool), the compressor 102 responds by starting to pump air again. When air is used, pressure at the high-pressure switch 202 drops and the switch changes state (e.g., closes). In response, the compressor clutch 106 engages and the bleed down valve 112 closes, which opens a compressor inlet valve 111 allowing air into the now turning pump within the compressor 102.

Additionally or alternatively, the circuit of FIG. 2 is designed to re-start the compressor 102 from a stand-by mode, which is an improvement over conventional compressor control schemes. The compressor 102 is configured to pump air until the high-pressure switch 202 reaches a set point or threshold level again, and the bleed down-to-idle process starts over. However, if air output is used before the compressor pressure decreases enough to initiate idling (e.g., a case pressure between 30 and 150 psi), the high-pressure switch 202 closes in response to the pressure drop, causing the inlet valve (e.g. inlet valve 111) to open and the compressor 102 is activated to again pump air.

The systems and controls described with respect to FIGS. 1 and 2 allow the compressor 102 to disengage and the engine 104 to idle with a fixed throttle position idle feature. The controls and systems are relatively simple in that only two pressure switches (e.g., high-pressure switch 202, low-pressure switch 204) are used to provide both compressor pressure control as well as activation of a stand-by mode, which in turn is configured to idle the engine 104 when no load is present. Therefore, no alternate control system or logic (e.g., a processor or computer control) is needed, as the control system both satisfies output need as well as reducing the load on the engine 104 by proceeding to a stand-by mode under certain conditions. In particular, a logic controller (e.g., a processor or other type of instruction based microcontroller) is not needed, as the circuit and system are configured to operate in response to the changes in pressure measured at the high-pressure switch 202 and/or low-pressure switch 204.

Figure 3:
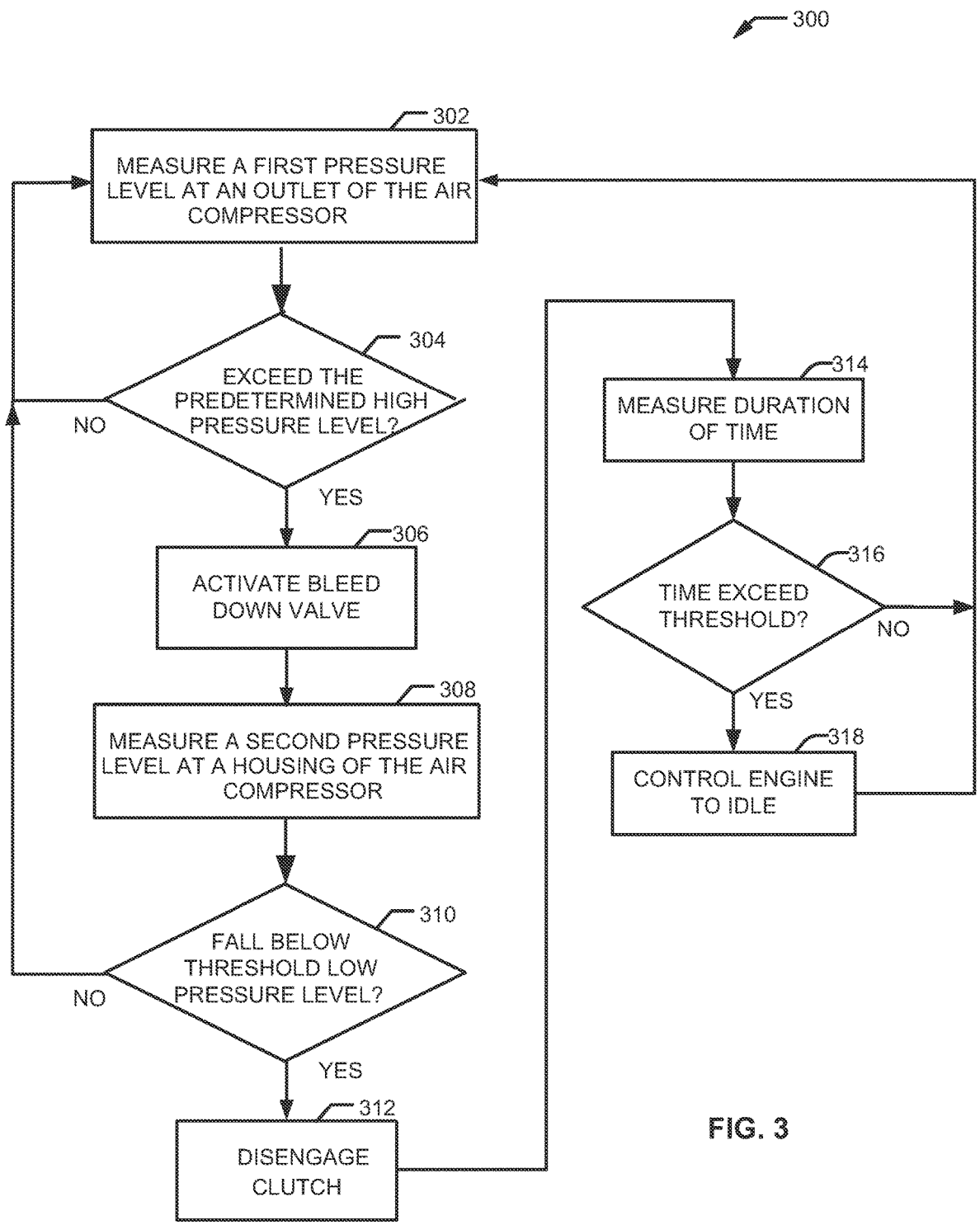
FIG. 3 illustrates an example method of operating a power system, in accordance with aspects of this disclosure.

FIG. 3 is a flowchart illustrating example method 300 of controlling an engine driven air compressor, as described with respect to FIGS. 1 and 2. In block 302, a first pressure sensor (e.g., the sensor 108) measures a first pressure level at an outlet (e.g., the outlet 116) of the air compressor (e.g., the air compressor 102).

In block 304, the first pressure level is compared to a predetermined threshold pressure level. If the first pressure level does not exceed the predetermined threshold pressure level, block 304 will return to block 302 in a loop to continuously monitor the pressure and other system parameters during implementation of the method. If the first pressure level exceeds the predetermined threshold pressure level, the method advances to block 306, where a bleed down valve (e.g., the bleed down valve 112) activates in response.

In block 308, a second pressure sensor (e.g., the sensor 110) measures a second pressure level. In block 310, the second pressure level is compared to a predetermined threshold pressure level (e.g., a threshold low-pressure level). If the second pressure level does not fall below the predetermined threshold low-pressure level, block 310 will return to block 308 in a loop to continuously monitor the pressure and other system parameters during implementation of the method. If the second pressure level does fall below the predetermined threshold low-pressure level, a clutch (e.g., the clutch 106) is controlled to disengage from an engine (e.g., the engine 104) in response to the second pressure level in block 310.

Additionally or alternatively, at block 314, a duration of time can be monitored and/or measured, during which the clutch of the air compressor is disengaged. The duration of time is compared against one or more threshold time values at block 316. If the time does not exceed the threshold, the method returns to block 314. If the time exceeds the threshold time value, the controller controls the engine to idle at block 318. Once the engine enters an idle speed, the method returns to block 302 to continue monitoring the pressure levels at the compressor outlet. Thus, once a demand for air pressure is measured, the engine can be controlled to increase in speed (e.g., change from an idle speed to an operating speed), as well as engage the clutch and disengage the bleed down valve.

Additionally or alternatively, method 300 of FIG. 3 may be implemented by the controller 114 of FIGS. 1-2 by executing machine-readable instructions, such as stored on a non-transitory machine-readable storage device. In such an examples, the controller 114 can receive electronic signals from the system sensors (e.g., a transducer) and control the system components based on a series of algorithms and/or calculations consistent with the examples provided herein.

Figure 4:
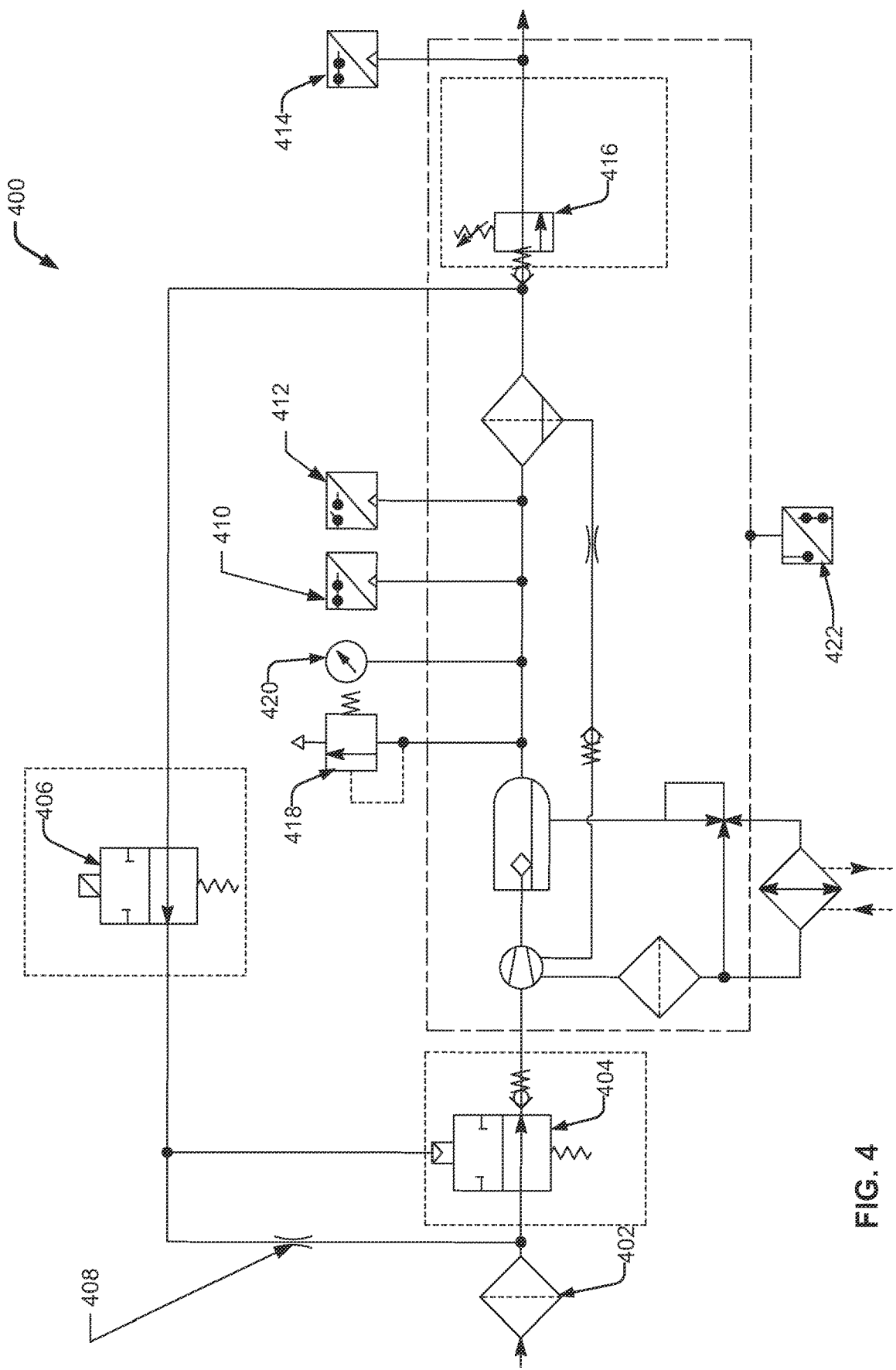
FIG. 4 illustrates an example pneumatic control for an air compressor, in accordance with the present disclosure.

FIG. 4 illustrates an example pneumatic control 400 for an air compressor, in accordance with the present disclosure. As shown in FIG. 4, an inlet filter 402 is connected to an inlet valve 404 to allow air to flow into the compressor. A blowdown valve 406 is connected to a blowdown orifice 408. An adjustable first, high-pressure switch 414 is configured to measure a pressure level of the compressor. A minimum pressure control valve 416 incorporates a check valve to maintain pressure downstream during blowdown of the compressor case. The blowdown valve 406 is configured to open in response to the high-pressure switch 414 sensing a pressure above a predetermined threshold level. Once activated/opened, the blowdown valve 406 in turn closes the inlet valve 404. For instance, the inlet valve 404 is pneumatically activated by the blowdown valve 406 to provide a timed pressure reduction of the compressor case until the high-pressure switch 414 no longer senses the pressure level above the predetermined threshold level.

A second, low-pressure switch 412 is configured to sense a second, low-pressure level in the compressor case, which can in response control a clutch (e.g. clutch 106) to disengage from an engine (e.g., engine 104). In particular, as the compressor case bleeds down and the pressure reduces to a predetermined level (e.g., 30 psi), the low-pressure switch 412 deactivates/opens which disengages the compressor clutch. The clutch disengages, which can also indicate that the engine is to enter into an idle mode.

If the pressure at the high-pressure switch 414 senses a pressure below the predetermined threshold level, the high-pressure switch 414 closes, which closes the blowdown valve 406 and in turn opens the inlet valve 404. The clutch can also be engaged, such that the engine is capable of turning the air compressor to increase pressure within the housing.

Additionally or alternatively, the pneumatic control 400 can include a pressure relief valve 418 as a safety outlet, pressure gauge 420, and an over pressure switch 410. For example, when a pressure exceeds a predetermined level, an over pressure switch 410 activates which disengages the compressor clutch. A case temperature sensor 422 can also provide information regarding a temperature in the air compressor.

Figure 5:
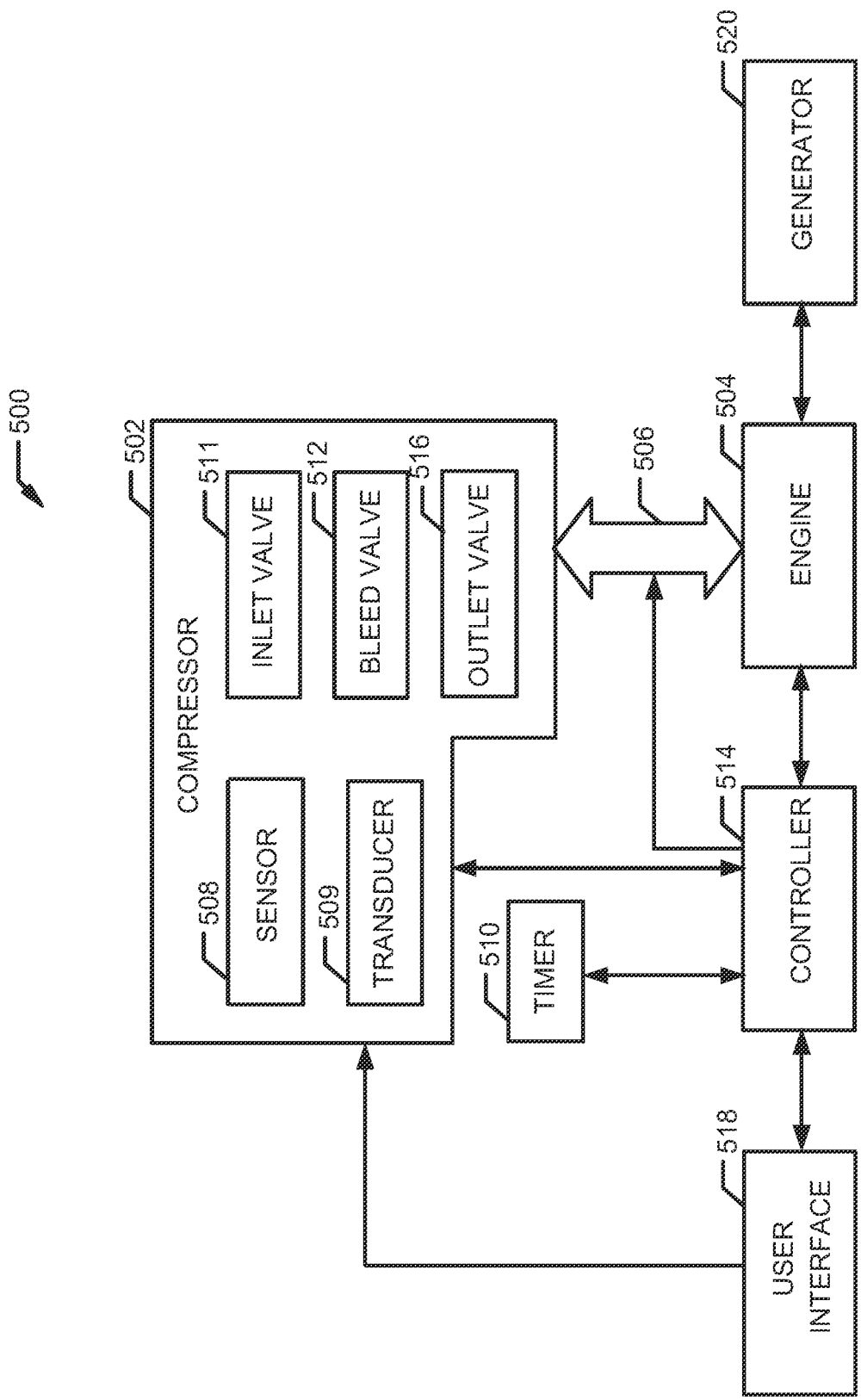
FIG. 5 is a functional diagram of another example power system, in accordance with aspects of this disclosure.

FIG. 5 is a functional diagram of another example power system 500. The system 500 is an engine-driven power system similar to the system 100, the system including an engine 504 that drives an air compressor 502 via a clutch 506. The system 500 can include a user interface 518, a generator 520, as well as other components described herein. In the example of FIG. 5, a sensor 508 measures pressure(s) within a housing/tank of the air compressor 502, at an outlet/outlet valve 516, an inlet, and/or another location of the air compressor 502. A controller 514 is configured to monitor and/or control one or more conditions of the system 500.

Additionally, the system 500 includes a timer 510, such as a countdown timer or other suitable timing device (e.g., incorporated with a microprocessor, etc.), configured to activate in response to a high-pressure level being sensed by the sensor 508. In particular, in response to the sensor 508 sensing a high-pressure level above a particular threshold level, a bleed down valve 512 controls a compressor inlet valve 511 to slowly reduce pressure in the compressor case upon closure of the inlet valve 511. Simultaneously or in response to the closure of the inlet valve 511, the timer 510 counts down a predetermined duration (e.g., between about 30 seconds and 2 minutes), which, upon expiry, can inform the controller 514 to disengage the clutch 506. Before disengaging the clutch 506, the controller 514 determines if the pressure level has reset (e.g., the sensor 508 no longer senses the high-pressure level). Thus, the timer 510 is reset each time the sensor 508 indicates the high-pressure condition is no longer present.

Figure 6:
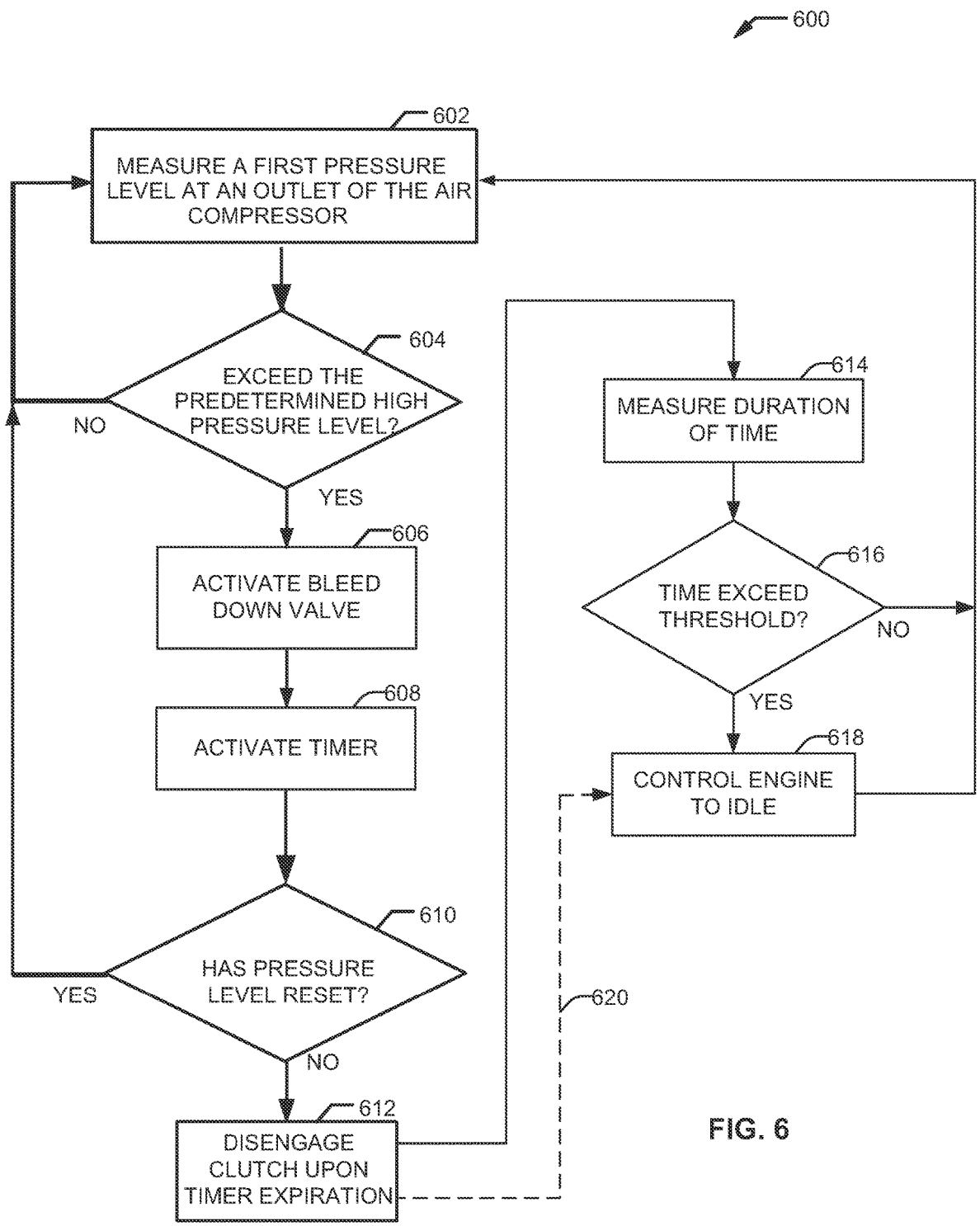
FIG. 6 illustrates another example method of operating a power system, in accordance with aspects of this disclosure.

FIG. 6 is a flowchart illustrating another example method 600 of controlling an engine driven air compressor, as described with respect to FIG. 5. In block 602, a pressure sensor (e.g., the sensor 508) measures a pressure level at an outlet (e.g., the outlet 516) of the air compressor (e.g., the air compressor 502). In block 604, the pressure level is compared to a predetermined threshold pressure level. If the pressure level does not exceed the predetermined threshold pressure level, block 604 will return to block 602 in a loop to continuously monitor the pressure and other system parameters during implementation of the method. If the pressure level exceeds the predetermined threshold pressure level, the method advances to block 606, where a bleed down valve (e.g., the bleed down valve 512) activates in response.

In block 608, a timer (e.g., the timer 510) counts down a predetermined amount of time. In block 610, the controller determines if the threshold pressure level is still being exceeded, such that the sensor has not reset (e.g., which would cause the timer to rest). If the sensor and the timer have reset, block 610 will return to block 608 in a loop to continuously monitor the pressure and other system parameters during implementation of the method. If the sensor and timer have not reset, a clutch (e.g., the clutch 506) is controlled to disengage from an engine (e.g., the engine 504) in response to expiration of the timer at block 612.

Additionally or alternatively, at block 614, a duration of time can be monitored and/or measured (e.g., by controller 514), during which the clutch of the air compressor is disengaged. The duration of time is compared against one or more threshold time values at block 616. If the time does not exceed the threshold, the method returns to block 614. If the time exceeds the threshold time value, the controller controls the engine to idle at block 618. Once the engine enters an idle speed, the method returns to block 602 to continue monitoring the pressure levels at the compressor outlet. Thus, once a demand for air pressure is measured, the engine can be controlled to increase in speed (e.g., change from an idle speed to an operating speed), as well as engage the clutch and disengage the bleed down valve.

Additionally or alternatively, block 612 proceeds directly to block 618 to control the engine to idle, as shown by dotted line 620. In this example, the duration of time is not monitored by the controller, and the engine is controlled to idle in response to expiration of the countdown timer.

Additionally or alternatively, method 600 of FIG. 6 may be implemented by the controller 514 of FIG. 5 by executing machine-readable instructions, such as stored on a non-transitory machine-readable storage device. In such an examples, the controller 514 can receive electronic signals from the system sensors (e.g., a transducer) and control the system components based on a series of algorithms and/or calculations consistent with the examples provided herein.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A method of controlling an engine driven air compressor, comprising:
    measuring, at a first pressure sensor, a first pressure level that exceeds a first threshold pressure level at an outlet of the air compressor;
    adjusting an inlet valve of the air compressor in response to the first pressure level exceeding the first threshold pressure level in order to limit an amount of air from being introduced into the air compressor;
    measuring, at a second pressure sensor, a second pressure level;
    controlling a clutch to disengage in response to the second pressure level falling below a second threshold pressure level, the clutch configured to transfer power from the engine to the air compressor;
    measuring a duration of time during which the clutch of the air compressor is disengaged;
    determining, at a controller, that the duration exceeds a threshold time; and
    controlling, via the controller, the engine to idle in response to the determination.

2. The method as defined in claim 1, further comprising activating a bleed down valve in response to the first pressure level exceeding the first threshold pressure level.

3. The method as defined in claim 1, further comprising controlling, by the controller, the engine to idle at a constant speed in response to the determination.

4. The method as defined in claim 1, further comprising, in response to the first pressure sensor measuring the first pressure level below the first threshold pressure level:
    controlling, via the controller, the inlet valve to open; and
    controlling, via the controller, the clutch to engage.

5. The method as defined in claim 4, further comprising deactivating a bleed down valve in response to measuring the first pressure level below the first threshold pressure level, which in turn controls the inlet valve to open.

6. The method as defined in claim 1, further comprising adjusting, via a user interface, the first threshold pressure level.

7. The method as defined in claim 1, wherein the first pressure sensor is one of a pressure transducer or a pressure switch configured to generate a signal in response to the first pressure level, the controller further configured to:
    receive, at the controller, the signal; and
    control, via the controller, the inlet valve in response to the signal.

8. A power system comprising:
    an air compressor driven by an engine via a clutch;
    a first pressure sensor configured to sense a first pressure level at an outlet of the air compressor;
    an inlet valve configured to close in response to the first pressure sensor sensing a first pressure level above a first threshold pressure level;
    a second pressure sensor configured to sense a second pressure level;
    the clutch configured to disengage in response to the second pressure level falling below a second threshold pressure level, the clutch configured to transfer power from the engine to the air compressor; and
    a controller configured to:
        measure a duration of time during which the clutch of the air compressor is disengaged;
        determine whether the duration exceeds a threshold time duration; and
        control the engine to idle in response to a determination that the time duration exceeds the threshold time duration.

9. The power system as defined in claim 8, further comprising an electric generator driven by the engine via a generator clutch, the generator clutch to drive the electric generator independently of the air compressor.

10. The power system as defined in claim 9, the controller further configured to:
    determine whether the engine is driving the electric generator; and
    control the engine to idle in response to the determination that the time duration exceeds the threshold time duration and a determination that the engine is not driving the electric generator.

11. The power system as defined in claim 10, wherein the threshold time duration is between 30 seconds and 2 minutes.

12. The power system as defined in claim 8, further comprising a bleed down valve configured to reduce a pressure within the air compressor in response to the first pressure level, which reduces a differential pressure and reduces a power needed to drive the air compressor.

13. The power system as defined in claim 8, wherein the second sensor is a mechanical pressure switch or an electronic pressure sensor.

14. A power system configured for welding operations to control an engine driven air compressor, comprising:
    a first pressure sensor configured to measure a first pressure level that exceeds a first threshold pressure level at an outlet of the air compressor;
    an inlet valve of the air compressor configured to close in response to the first pressure level exceeding the first threshold pressure level in order to stop air from being introduced into the air compressor;
    a second pressure sensor configured to sense a second pressure level at the outlet of the air compressor;
    a clutch configured to disengage in response to the second pressure level falling below a second threshold pressure level, the clutch configured to transfer power from the engine to the air compressor; and
    a bleed down valve configured to activate in response to the first pressure level exceeding, the first threshold pressure level, which in turn controls the inlet valve to close, wherein the bleed down valve lowers a pressure level in the air compressor from the first pressure level to the second pressure level, wherein the first and second pressure sensors correspond to first and second switches operable to change state in response to the first and second pressure levels to control operation of the bleed down valve.

15. The welding-type power system as defined in claim 14, wherein, in response to the first pressure sensor sensing a pressure level below the first threshold pressure level, the bleed down valve is further configured to close, the inlet valve is configured to open, and the clutch is configured to engage to transfer power from the engine to the air compressor.

16. The welding-type power system as defined in claim 14, wherein the first pressure sensor is a transducer having an adjustable pressure range.

17. The welding-type power system as defined in claim 16, further comprising a controller configured to:
   receive signals from the transducer corresponding to the first pressure level; and
   control one or more of the bleed down valve, the inlet valve, the clutch, or the engine in response to the signals.

18. The welding-type power system as defined in claim 14, wherein the first and second switches are arranged in parallel.

* * * * *